UNITED STATES PATENT OFFICE.

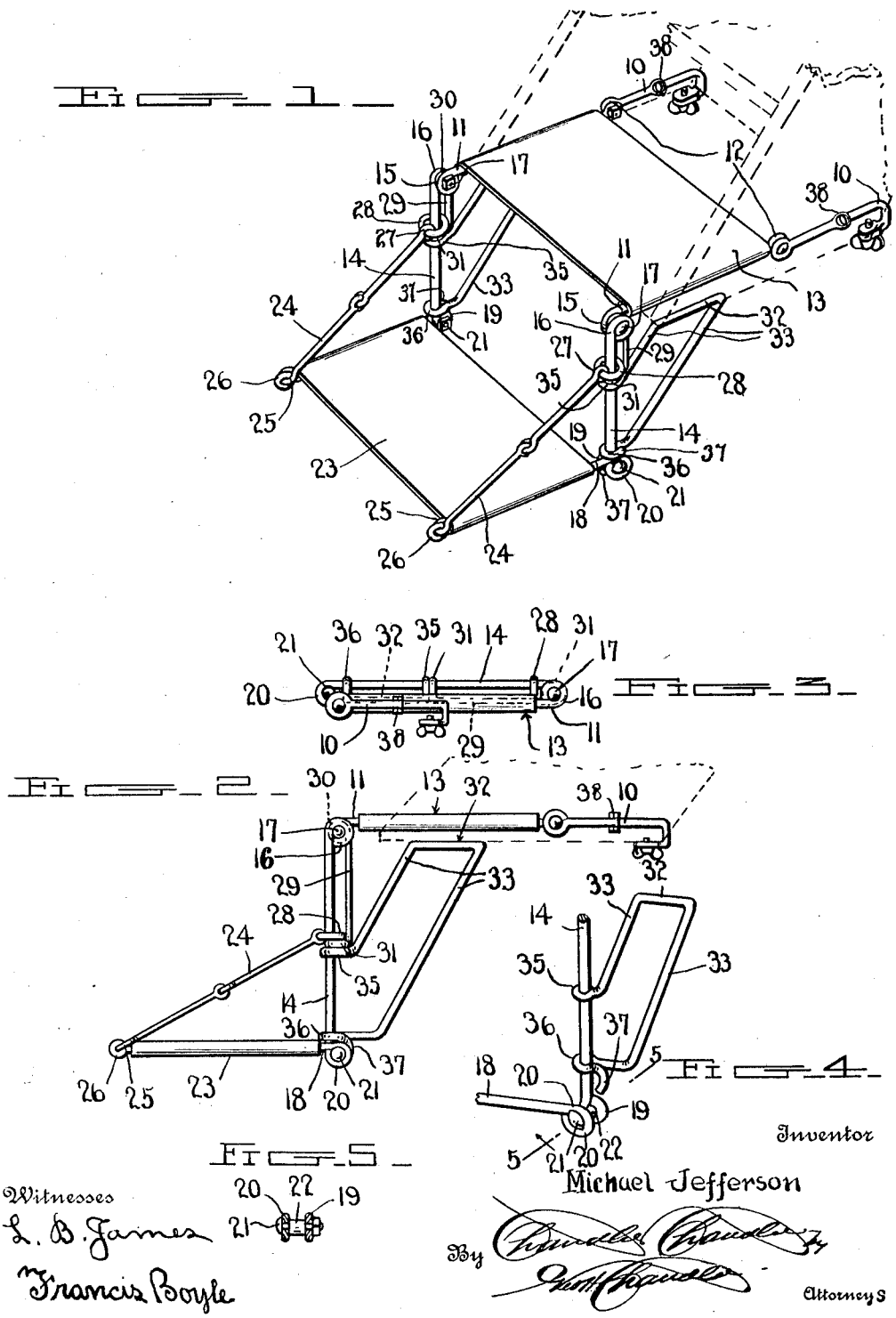

MICHAEL JEFFERSON, OF MONROE, LOUISIANA.

FOLDING STEPS.

1,026,167.

Specification of Letters Patent.

Patented May 14, 1912.

Application filed March 23, 1911. Serial No. 616,456.

*To all whom it may concern:*

Be it known that I, MICHAEL JEFFERSON, a citizen of the United States, residing at Monroe, in the parish of Ouachita, State of Louisiana, have invented certain new and useful Improvements in Folding Steps; and I do hereby declare the following to be a full, clear, and exact description of the invention, such as will enable others skilled in the art to which it appertains to make and use the same.

This invention relates to portable steps and has for its principal object to provide steps of this character that may be more compactly folded for storing than usual, and will have novel props that will positively hold the steps against collapsing when in operative position.

With the above object in view the invention consists in certain novel details of construction and combination of parts hereinafter fully described and claimed, it being understood that various modifications may be made in the form proportion and minor details of construction within the scope of the appended claims.

In the accompanying drawing forming part of this specification:—Figure 1 is a perspective view of the steps in operative position, Fig. 2 is a side elevation of the steps shown in Fig. 1. Fig. 3 is a side elevation of the steps in folded position. Fig. 4 is a fragmentary perspective view showing one of the props. Fig. 5 is a cross sectional view taken on the line 5—5 Fig. 4.

Referring now to the drawing the steps comprise a pair of spaced brackets 10, for securing the steps to a suitable support. A pair of arms 11 are hinged as shown at 12 to the free ends of the brackets, the hinges being so formed as to permit of the arms folding rearwardly upon the top faces of the brackets as shown in Fig. 3. A tread of sheet metal 13 is arranged to span the arms 11 being terminally secured to the latter in any desired manner, the preferred construction being to wrap end portions about the arms as shown.

Spaced risers 14 are arranged upon the free ends of the tread arms, these parts being hingedly connected at their meeting in any desired manner, the preferred construction being to form eyes 15 and 16 on the tread arms and risers respectively, these eyes being arranged side by side and a pivot bolt 17 passed therethrough.

Arranged at the lower ends of the risers is a second pair of tread arms 18, the confronting ends of these parts being equipped with eyes 19 and 20 which are arranged side by side and connected by a single pivot bolt 21, and these eyes are preferably held spaced from each other to provide a locking seat for a collapsing prop hereinafter described. Any desired construction for holding the eyes spaced may be employed, the construction here illustrated being to form the shank of the pivot bolt with a central cylindrical spacing boss 22 as shown in Fig. 5. A tread 23 is arranged to span the lower tread arms 18, this tread being formed of sheet metal or other suitable material and terminally secured to the tread arms. By virtue of the pivotal connection between the risers and the lower tread arms, the lower tread may fold back upon the risers as shown in dotted lines in Fig. 2.

For holding the lower tread in operative position a pair of jointed hanger links 24 are terminally provided with eyes, the lower eyes 25 loosely engaging with terminal eyes 26 formed on the lower tread arm and the upper eyes 27 loosely engaging with rings 28 that are mounted for sliding movement on the risers.

A pair of rods 29 are provided at their upper end with eyes 30 that encircle the pivot bolts 17 of the upper tread arms, the shanks of the rods being parallel with and spaced from the risers so that the slide rings 28 may freely slide therebetween. The lower end of the rods are formed with eyes 31 that encircle the risers and perform the function of stops to limit the downward movement of the slide rings so that the jointed hangers when in operative position maintain the lower tread in a horizontal plane.

The props 32 for preventing collapsing of the steps each comprise a single length of round material having obliquely extending portions 33 equipped with eyes 35 and 36 which encircle the adjacent riser rod 14. It will be observed that when the risers are in operative position the props form inclined braces which abut the lower faces of the upper tread bars 11 so that collapsing of the steps is prevented. It will be observed that these props 32 by virtue of the terminal eyes are rotatable toward each other so that the risers and props may lie in a common plane for compact folding of the steps.

In order to lock the props in their operative position the lowermost eyes 36 of the prop are provided with arcuate downwardly projecting lugs 37 which gravitate into engagement with the spacing boss 22 and are held against lateral movement thereon by the eyes 19 and 20 of the risers and lower tread arms. Thus accidental disengagement of the props from position is prevented since the props must be manually raised vertically upon the risers to disengage the tongues from their locked position.

In order that the hooked ends of the brackets 10 may be secured to either the treads or the side walls of the car steps a swivel joint 38 is formed in each bracket, this joint permitting of the hooked end of the bracket swiveling so as to hook over either the rear edge of the step tread, or the rear edge of the step side sills as preferred.

What is claimed, is:—

1. Skeleton steps comprising treads connected by spaced risers, swinging props fitted on said risers and forming inclined braces engageable with the overlying treads for preventing collapsing of the steps, and interlocking means between said risers and props.

2. Skeleton steps comprising upper and lower treads, risers connecting said treads, the lower tread being foldable upon said riser, and both of them foldable bodily upon the upper tread, a swinging prop carried by said riser and engaging with said upper tread, and interlocking means between said prop and riser.

3. Skeleton steps comprising upper and lower treads, an intermediate riser connecting said treads, pivotal connections between said treads and risers, an inclined prop mounted for swinging movement on said riser, and engageable with the overlying tread, a locking lug on said prop, and a locking seat carried by said riser engageable with said locking lug.

In testimony whereof, I affix my signature, in presence of two witnesses.

MICHAEL JEFFERSON.

Witnesses:
J. R. MILLER,
D. W. STEWART.

---

Copies of this patent may be obtained for five cents each, by addressing the "Commissioner of Patents, Washington, D. C."